United States Patent
Liu et al.

(10) Patent No.: US 9,537,694 B2
(45) Date of Patent: Jan. 3, 2017

(54) SIGNAL CODING AND DECODING METHODS AND DEVICES

(71) Applicant: HUAWEI TECHNOLOGIES CO., LTD., Shenzhen, Guangdong (CN)

(72) Inventors: Zexin Liu, Beijing (CN); Lei Miao, Beijing (CN); Fengyan Qi, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 190 days.

(21) Appl. No.: 14/496,986

(22) Filed: Sep. 25, 2014

(65) Prior Publication Data

US 2015/0010021 A1    Jan. 8, 2015

Related U.S. Application Data

(63) Continuation of application No. PCT/CN2012/075924, filed on May 23, 2012.

(30) Foreign Application Priority Data

Mar. 29, 2012 (CN) .......................... 2012 1 0087702

(51) Int. Cl.
*H04L 27/26* (2006.01)
*H04L 5/06* (2006.01)
(Continued)

(52) U.S. Cl.
CPC ......... *H04L 27/2602* (2013.01); *G10L 19/002* (2013.01); *G10L 19/0204* (2013.01); *H04L 5/06* (2013.01); *G10L 19/26* (2013.01)

(58) Field of Classification Search
CPC ...... H04L 27/2602; H04L 5/06; G01L 19/002; G01L 19/26; G01L 19/0204; G06T 9/008
(Continued)

(56) References Cited

U.S. PATENT DOCUMENTS 5,825,310 A    10/1998 Tsutsui
6,226,616 B1    5/2001 You et al.
(Continued)

FOREIGN PATENT DOCUMENTS

CN    101046962 A    10/2007
CN    101055720 A    10/2007
(Continued)

OTHER PUBLICATIONS

Herve Taddei et al: "Approved APP Recommendation text for G.729.1-SWB Annex", ITU-T WP3/16, XP044050826, Apr. 6-9, 2010, total 70 pages.
(Continued)

Primary Examiner — Afsar M Qureshi
(74) Attorney, Agent, or Firm — Huawei Technologies Co., Ltd.

(57) ABSTRACT

In a signal coding method, bits for coding allocated to different bands of a frequency domain signal obtained from an input signal are adjusted to improve the coding quality. The total available bits for coding are first allocated to the bands of the frequency domain signal according to a predetermined allocation rule. The numbers of bits allocated to the respective bands of the frequency domain signal are then adjusted when a highest frequency of the frequency domain signal to which bits are allocated is greater than a predetermined value. The frequency domain signal is coded according to the adjusted bit allocation for the bands of the frequency domain signal.

10 Claims, 6 Drawing Sheets

(51) Int. Cl.
*G10L 19/002* (2013.01)
*G10L 19/02* (2013.01)
*G10L 19/26* (2013.01)

(58) Field of Classification Search
USPC .......................................................... 370/480
See application file for complete search history.

(56) References Cited

U.S. PATENT DOCUMENTS

| | | | |
|---|---|---|---|
| 6,356,211 | B1 | 3/2002 | Shimoyoshi et al. |
| 7,349,842 | B2 | 3/2008 | Youn |
| 7,860,721 | B2 | 12/2010 | Tsushima et al. |
| 8,055,500 | B2 | 11/2011 | Kim et al. |
| 2001/0023399 | A1 | 9/2001 | Matsumoto et al. |
| 2003/0061055 | A1 | 3/2003 | Taori et al. |
| 2005/0254588 | A1 | 11/2005 | Kim et al. |
| 2007/0127580 | A1 | 6/2007 | Lei et al. |
| 2007/0244699 | A1 | 10/2007 | Mogi et al. |
| 2007/0276661 | A1 | 11/2007 | Dimkovic et al. |
| 2008/0082321 | A1 | 4/2008 | Ide |
| 2010/0094638 | A1 | 4/2010 | Lee et al. |
| 2010/0153097 | A1 | 6/2010 | Hotho et al. |
| 2011/0264454 | A1 | 10/2011 | Ullberg et al. |
| 2011/0305352 | A1 | 12/2011 | Villemoes et al. |
| 2013/0018660 | A1 | 1/2013 | Qi et al. |

FOREIGN PATENT DOCUMENTS

| | | |
|---|---|---|
| CN | 101436407 A | 5/2009 |
| CN | 101494054 A | 7/2009 |
| CN | 101523485 A | 9/2009 |
| CN | 102208188 A | 10/2011 |
| EP | 1840873 A1 | 10/2007 |
| EP | 1873753 A1 | 1/2008 |
| JP | 09261064 A | 10/1997 |
| JP | 2007264154 A | 10/2007 |
| KR | 20050108180 A | 11/2005 |
| RU | 2406166 C2 | 12/2010 |
| RU | 2411594 C2 | 2/2011 |
| WO | 2011048098 A1 | 4/2011 |

OTHER PUBLICATIONS

Juin-Hwey Chen et al:"Adaptive postfiltering for quality enhancement of coded speech", XP055104008, Jan. 1995, total 13 pages.

Device 600

FIG. 6

Device 700

FIG. 7

Device 800

SIGNAL CODING AND DECODING METHODS AND DEVICES

CROSS-REFERENCE TO RELATED APPLICATION

This application is a continuation of International Application No. PCT/CN2012/075924, filed on May 23, 2012, which claims priority to Chinese Patent Application No. 201210087702.9, filed on Mar. 29, 2012, both of which are hereby incorporated by reference in their entireties.

TECHNICAL FIELD

Embodiments of the present invention relate to the communications field, and in particular, to methods and devices for signal coding and decoding.

BACKGROUND

In the field of communications such as mobile communications and fiber optic communications, a coding technology is used at a transmit end to compress a signal to be transmitted, so as to improve the transmission efficiency, and a corresponding decoding technology is used at a receive end to restore the transmitted signal. According to a characteristic, a transmission condition, and the like of a signal, time domain coding and/or frequency domain coding may be performed on the signal. Different bits for coding are allocated to a time domain signal or a frequency domain signal according to a certain rule, and then the signal is coded according to the allocated bits by using a coding method. To improve the signal transmission efficiency, it is expected that a signal to be transmitted is represented by using as few bits for coding as possible. Therefore, the bits for coding need to be allocated properly, so that output signals are restored with least distortion at the receive end by using decoding.

In an existing coder for an audio signal, when a code rate is low, a coding and decoding effect may generally be good for speech, but the coding and decoding effect is poor for music. To improve the quality of the music when the code rate is low, an input signal is coded by using some bits and by using a time domain coding method; and a frequency domain signal is obtained according to the input signal, and the frequency domain signal is coded by using rest bits and by using a frequency domain coding method. When the frequency domain signal is coded by using the rest bits, a feature of the signal is generally not considered, and bit allocation is uniformly performed on the frequency domain signal, which leads to a poor coding effect for some frequency domain signals. In an existing decoder for an audio signal, the frequency domain signal is restored by simply using the decoding technology corresponding to the coding technology, noise is filled into a frequency domain signal that is not obtained by decoding, and then frequency domain inverse transformation and time domain synthesis processing are performed to obtain the output signal. Extra noise is introduced when the noise is filled into some signals, which reduces the quality of the output signal.

Therefore, an existing solution of performing uniform bit allocation in a frequency domain coding algorithm leads to a poor coding effect for some signals; and the foregoing noise filling processing in an existing frequency domain decoding algorithm reduces the quality of the output signal.

SUMMARY

Embodiments of the present invention provide signal coding and decoding methods and devices, where, during coding, bit allocation for a frequency domain signal can be optimized, so as to achieve a better coding effect by using the same number of bits, and during decoding, a frequency domain excitation signal can be extended under the guidance of information obtained by frequency domain decoding, so as to achieve a better effect of an output signal.

According to one aspect, a signal coding method is provided, where the method includes: obtaining a frequency domain signal according to an input signal; allocating predetermined bits to the frequency domain signal according to a predetermined allocation rule; adjusting the bit allocation for the frequency domain signal when a highest frequency of the frequency domain signal to which bits are allocated is greater than a predetermined value; and coding the frequency domain signal according to the bit allocation for the frequency domain signal.

According to another aspect, a signal decoding method is provided, where the method includes: obtaining, from a received bit stream, a frequency domain signal obtained by decoding; when the frequency domain signal obtained by decoding meets a predetermined condition, predicting, according to the frequency domain signal obtained by decoding, a frequency domain signal that is not obtained by decoding; and obtaining, according to the frequency domain signal obtained by decoding and the predicted frequency domain signal, a time domain signal that is finally outputted.

According to still another aspect, a signal coding device is provided, where the device includes: a frequency domain transformation unit, which obtains a frequency domain signal according to an input signal; a bit allocation unit, which allocates predetermined bits to the frequency domain signal according to a predetermined allocation rule; a bit adjustment unit, which adjusts the bit allocation for the frequency domain signal when a highest frequency of the frequency domain signal to which bits are allocated is greater than or equal to a predetermined value; and a frequency domain coding unit, which codes the frequency domain signal according to the bit allocation for the frequency domain signal.

According to still another aspect, a signal decoding device is provided, where the device includes: a decoding unit, which obtains, from a received bit stream, a frequency domain signal obtained by decoding; a bandwidth extension unit, configured to predict a frequency domain signal that is not obtained by decoding, and when the frequency domain signal obtained by decoding meets a predetermined condition, predict, according to the frequency domain signal obtained by decoding, the frequency domain signal that is not obtained by decoding; and an output unit, which obtains, according to the frequency domain signal obtained by decoding and the predicted frequency domain signal, a time domain signal that is finally outputted.

In the foregoing technical solutions of the embodiments of the present invention, during coding, bit allocation for a frequency domain signal is adjusted according to a highest frequency of the frequency domain signal to which bits are allocated, so that a better coding effect is achieved when frequency domain coding is performed by using the same number of bits; and during decoding, a frequency domain signal that is not obtained by decoding is set under the guidance of the frequency domain signal obtained by decoding, so as to achieve a better effect of an output signal.

BRIEF DESCRIPTION OF DRAWINGS

To describe the technical solutions in the embodiments of the present invention more clearly, the following briefly introduces accompanying drawings required for describing the embodiments or the prior art. Apparently, the accompanying drawings in the following description show merely some embodiments of the present invention.

DESCRIPTION OF EMBODIMENTS

The following clearly describes the technical solutions in embodiments of the present invention with reference to accompanying drawings in the embodiments of the present invention. Apparently, the described embodiments are a part of the embodiments of the present invention rather than all of the embodiments.

A coding technical solution and a decoding technical solution in the present invention may be applied to sending and receiving in various communications systems, where the communications systems are, for example, a GSM, a Code Division Multiple Access (CDMA, Code Division Multiple Access) system, Wideband Code Division Multiple Access (WCDMA, Wideband Code Division Multiple Access Wireless), a General Packet Radio Service (GPRS, General Packet Radio Service), and Long Term Evolution (LTE, Long Term Evolution).

The coding technical solution and the decoding technical solution are widely applied to various electronic devices, for example, a mobile phone, a wireless apparatus, a personal data assistant (PDA), a handheld or portable computer, a GPS receiver/navigator, a camera, an audio/video player, a video camera, a video recorder, a monitoring device, and the like. Generally, this type of electronic device includes an audio coder or an audio decoder, where the audio coder or decoder may be directly implemented by a digital circuit or a chip, for example, a DSP (digital signal processor), or be implemented by that software code drives a processor to perform a procedure in the software code.

As an example, in an audio coding technical solution, first, an audio time domain signal is transformed into a frequency domain signal, then a bit for coding is allocated to the audio frequency domain signal for coding, a coded signal is transmitted to a decoding end by using a communications system, and the coded signal is decoded at the decoding end to restore the frequency domain signal.

Figure 1:
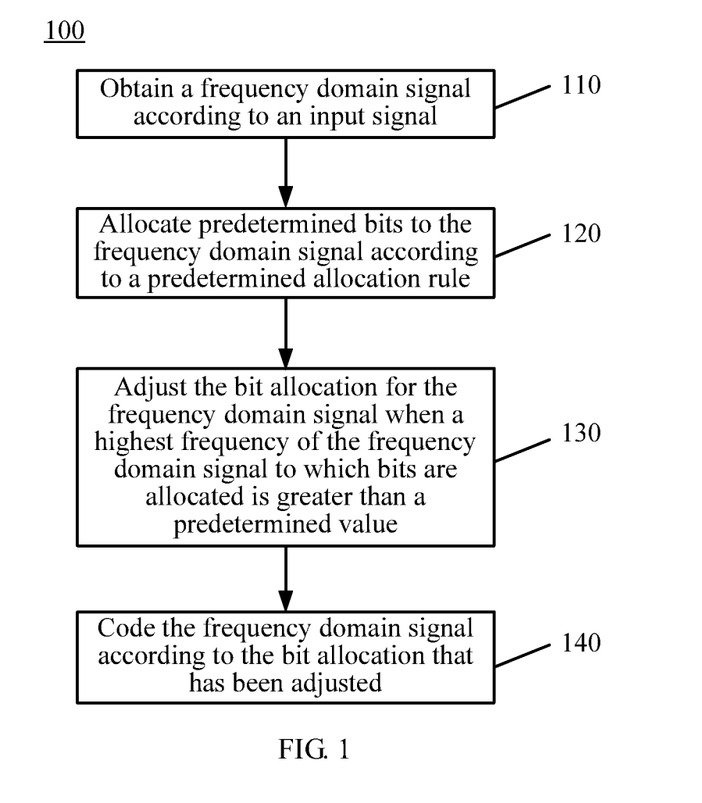
FIG. 1 shows a signal coding method according to an embodiment of the present invention.

FIG. 1 shows a signal coding method 100 according to an embodiment of the present invention. As shown in FIG. 1, the method includes:

110: Obtain a frequency domain signal according to an input signal. The input signal may be of various types, such as an image signal, a data signal, an audio signal, a video signal, or a text signal. Frequency domain transformation may be performed on the input signal by using an algorithm such as a fast Fourier transform (FFT, Fast Fourier Transform) or a discrete cosine transform (DCT, Discrete Cosine Transform), to obtain the frequency domain signal. The type of the input signal and the frequency domain transformation algorithm do not constitute a limitation to the present invention.

120: Allocate predetermined bits to the frequency domain signal according to a predetermined allocation rule. The predetermined bits tot_bit are bits that need to be used for performing frequency domain coding on the frequency domain signal. The predetermined allocation rule, for example, may be that: more bits in the predetermined bits are allocated to a low frequency band signal in the frequency domain signal, and rest bits in the predetermined bits are allocated to a frequency band with greater energy except the low frequency band signal. The more bits may be uniformly allocated to the low frequency band signal for all low frequency bands or the more bits may be allocated to the low frequency band signal according to energy distribution of the low frequency band signal. A reason for allocating the more bits to the low frequency band signal is that, in a speech/audio signal or the like, the low frequency band signal generally includes information more sensitive to a human ear.

The following uses frequency domain coding of an audio signal as an example for description. During the frequency domain coding, the frequency domain signal is generally divided into sub-bands at an equal interval according to frequencies, or is divided into sub-bands according to frequency domain coefficients, for example, is divided into one sub-band every 16 frequency domain coefficients. For example, for a wideband signal whose frame length is 20 ms, 160 coefficients in a frequency range of 0 to 4 kHz are divided into 10 sub-bands, where there are 5 sub-bands in a frequency range of 0 to 2 kHz, and there are 5 sub-bands in a frequency range of 2 to 4 kHz. Then, bit allocation is performed for each sub-band. The more bits whose quantity is 1F_bit are allocated to a low frequency domain signal in the frequency range of 0 to 2 kHz, the number rest_bit of the rest bits is obtained by subtracting 1F_bit from the number tot_bit of the predetermined bits, and the rest bits rest bit are allocated to the sub-bands in the frequency range of 2 to 4 kHz according to an envelope size of each sub-band in the frequency range of 2 to 4 kHz, where each sub-band has 5 bits. The number of sub-bands to which bits are allocated and a sub-band last_bin of a highest frequency band to which bits are allocated are determined according to the rest_bits and the envelope size of each sub-band, and at the same time, a remainder that cannot be exactly divided by 5 is evenly allocated to each sub-band in the range of 0 to 2 kHz.

130: Adjust the bit allocation for the frequency domain signal when a highest frequency of the frequency domain signal to which bits are allocated is greater than a predetermined value B. The predetermined value B may be set according to an empirical value; in an embodiment, the predetermined value B may be determined according to the bit number tot_bit of the predetermined bits and a resolution of the frequency domain signal (for example, there are 320 frequency domain coefficients in a bandwidth range of 0 to 8 kHz). In the case of a fixed bandwidth, a larger bit number tot_bit of the predetermined bits indicates a larger predetermined value B; and when the bit number tot_bit of the predetermined bits is fixed, a higher resolution of the frequency domain signal indicates a larger predetermined value B. When a bandwidth is fixed and the resolution of the frequency domain signal is also fixed, the predetermined value B may be determined only according to the bit number tot_bit of the predetermined bits, and a larger bit number tot_bit of the predetermined bits indicates a larger predetermined value B. The predetermined value B is a preset upper-limit frequency value. For example, it is estimated according to experience that, after the frequency domain transformation is performed on the input signal, generally no bit is allocated to a frequency domain signal whose frequency is greater than the predetermined value. Therefore, in specific practice, the predetermined value B may be set to a frequency value that is a certain frequency less than a value of the highest frequency of the frequency domain signal, for example, set to 2.9 kHz, 3.2 kHz, 3.5 kHz, or the like. In another embodiment, the predetermined value B may also be determined according to another factor such as a frame length, a used transformation method, or a transformation window length.

When the frequency domain signal is divided into sub-bands for coding, the predetermined value B may be an index number of 20 sub-bands in a frequency range of 0 to 8 kHz, and the highest frequency of the frequency domain signal to which bits are allocated may also be represented by using an index number of a sub-band in which the highest frequency is located. For example, for a wideband signal whose sampling rate is 16 kHz, a frame length is 20 ms; if a transmission rate is 6.8 kbps, B is set to 6 according to the total number (20) of sub-bands and the number of predetermined bits to be allocated (6.8 kbps×20 ms=136 bits); and when the transmission rate is 7.6 kbps, B is set to 8 according to the total number (20) of the sub-bands and the number of predetermined bits to be allocated (7.6 kbps×20 ms=152 bits). In summary, the predetermined value B and the highest frequency of the frequency domain signal to which bits are allocated are not limited to frequency numerical values, and may also be the index numbers of the sub-bands. After reading a disclosure of the embodiments of the present invention, an engineering technical person knows, according to a practical condition, how to determine whether the highest frequency of the frequency domain signal to which bits are allocated is greater than the predetermined value.

The following describes adjustment of the bit allocation for the frequency domain signal. According to a type, a frequency domain characteristic, or the like of a signal, bits, in the frequency domain signal, of a part that contributes less to an output at a decoding end may be subtracted, and bits allocated to the highest frequency to which bits are allocated and its nearby frequency domain signal may accordingly be increased. That is, the adjusting the bit allocation for the frequency domain signal may include: reducing the number of bits allocated to a frequency band to which more bits are allocated in the frequency domain signal, and increasing the number of bits allocated to the highest frequency to which bits are allocated and its nearby frequency domain signal. For an audio signal, the frequency band to which more bits are allocated is a low frequency band of 0 to 2 kHz. The following describes, by using examples, adjustment of the bit allocation for the frequency domain signal.

An adjustment example 1: The highest frequency to which bits are allocated is 4 kHz. If 0 bit is allocated to a sub-band in a range of 2 kHz to 4 kHz, 5 bits are allocated to this frequency band until the number of bits is allocated to all sub-bands in the range of 2 kHz to 4 kHz. It is assumed that the number of bits additionally added in the range of 2 to 4 kHz is $N_{bit}$. In this case, $N_{bit}$ bits need to be subtracted from the sub-bands in the range of 0 to 2 kHz. For example, a used algorithm is that: 1 bit is subtracted from each sub-band in all sub-bands (5 sub-bands) in the range of 0 to 2 kHz, and then a sub-band with the highest frequency is reduced; and 1 bit is subtracted again from each sub-band in the rest 4 sub-bands, and a sub-band with the second highest frequency is reduced again, and the rest is deduced by analogy until the number of bits that are subtracted is equal to $N_{bit}$.

An adjustment example 2: J bits are added to all sub-bands to which bits are allocated in the range of 2 kHz to 4 kHz; and it is assumed that the number of sub-bands to which bits are allocated in the range of 2 to 4 kHz is K; in this case, the number $N_{bit}$ of bits additionally added in the range of 2 to 4 kHz is equal to J×K, and $N_{bit}$=J×K bits need to be subtracted from the sub-bands in the range of 0 to 2 kHz. For example, the algorithm that may be used is that: $N_{bit}/5$ bits are subtracted on average from each sub-band in all sub-bands (5 sub-bands) in the range of 0 to 2 kHz.

An adjustment example 3: 5 bits are allocated to each sub-band to which the number of bits is not allocated in the range of 2 kHz to 4 kHz; then J bits are added to all sub-bands in the range of 2 to 4 kHz; if the number of sub-bands to which bits are allocated in the range of 2 to 4 kHz is K, in this case, the number $N_{bit}$ of bits additionally added in the range of 2 to 4 kHz is equal to 5×(5−K)+5×J, and $N_{bit}$ bits need to be subtracted from the sub-bands in the range of 0 to 2 kHz. A used algorithm may be: any one of the algorithm in the adjustment example 1 and the algorithm in the adjustment example 2.

In addition, if the highest frequency of the frequency domain signal to which bits are allocated is less than the predetermined value, the allocation of the predetermined bits that is performed according to the predetermined allocation rule in 120 is maintained.

140: Code the frequency domain signal according to the bit allocation that has been adjusted. In practice, any frequency domain coding method may be used according to a requirement. The selected frequency domain coding method does not constitute a limitation to the present invention.

By using the foregoing signal coding method, bit allocation for a frequency domain signal is adjusted according to a highest frequency of the frequency domain signal to which bits are allocated, so that a better coding effect is achieved when frequency domain coding is performed by using the same number of bits.

The foregoing signal coding method may be properly applied to various coding solutions, and the following uses an application of the method in time-frequency joint coding as an example for exemplary description.

Figure 2:
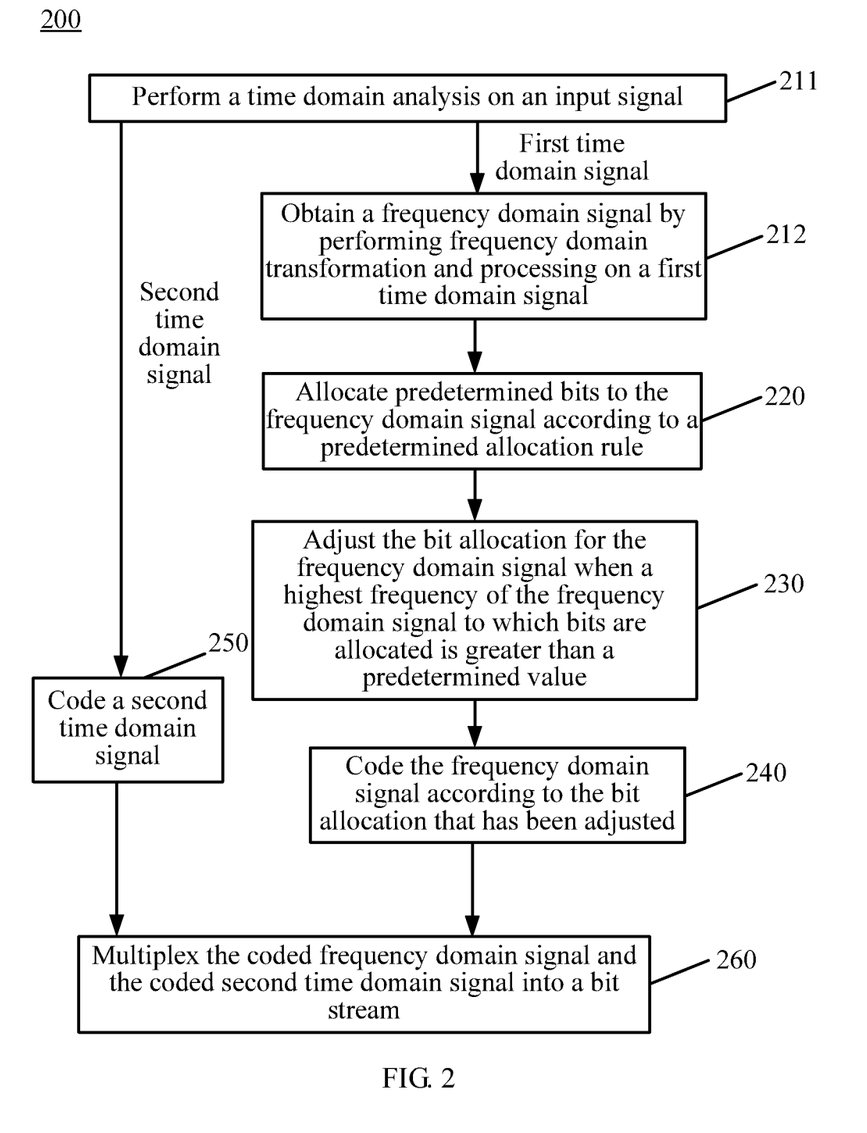
FIG. 2 shows a time-frequency joint coding method using a coding method in an embodiment of the present invention.

FIG. 2 shows a time-frequency joint coding method 200 according to an embodiment of the present invention. In FIG. 2, 220, 230, and 240 are respectively the same as 120, 130, and 140 in FIG. 1. Differences between FIG. 2 and FIG. 1 lie in that, step 250 and step 260 are added, and 110 in FIG. 1 is replaced by 211 and 212. The following describes the differences between FIG. 2 and FIG. 1, and does not describe the content in common again.

211: Obtain a first time domain signal and a second time domain signal by performing a time domain analysis on an input signal. For example, a linear predictive coding (LPC, linear predictive coding) analysis and processing are performed on the input signal to obtain one of a line spectral frequency (Line Spectral Frequency, LSF) parameter and an immittance spectral frequency (Immittance Spectral Frequency, ISF) parameter, and further to obtain a residual signal res and an adaptive codebook contribution exc_pit. The LSF parameter or the ISF parameter is used to represent a frequency domain feature of a coefficient (that is, an LPC coefficient) that is used in the LPC analysis. The residual signal res and the adaptive codebook contribution exc_pit are included in the first time domain signal, and the adaptive codebook contribution exc_pit is included in the second time domain signal.

212: Obtain a frequency domain signal by performing frequency domain transformation and processing on the first time domain signal. As an example, the frequency domain transformation is performed separately on the residual signal res and the adaptive codebook contribution exc_pit in the first time domain signal, and then it is determined, according to relevance between a residual signal f_res of a frequency domain and an adaptive codebook contribution f_exc_pit of the frequency domain, whether the adaptive codebook contribution contributes to an output signal. If the adaptive codebook contribution contributes to the output signal, the adaptive codebook contribution f_exc_pit of the frequency domain is subtracted from the residual signal f_res of the frequency domain, to obtain a difference signal f_diff of the frequency domain, and the difference signal f_diff is used as the frequency domain signal. If the adaptive codebook contribution does not contribute to the output signal, the residual signal f_res of the frequency domain is directly used as the difference signal f_diff, that is, the frequency domain signal.

After the frequency domain signal is obtained, the frequency domain signal is coded by using 220, 230, and 240 that are the same as 120, 130, and 140 in FIG. 1, to obtain a coded frequency domain signal.

250: Code the second time domain signal. As an example, 260 is performed at the same time when the frequency domain signal is coded. The time domain signal may be coded by using any time domain coding method (such as prediction coding or pulse code modulation (Pulse Code Modulation, PCM) coding), and a used time domain coding method does not constitute a limitation to the present invention. When the adaptive codebook contribution contributes to the output signal, the adaptive codebook contribution needs to be obtained at a decoding end, and therefore, the adaptive codebook contribution exc_pit in the second time domain signal is coded, so that it is transmitted as a bit stream to a receive end. However, if the adaptive codebook contribution does not contribute to the output signal, that is, an output at the decoding end does not require the adaptive codebook contribution, this part of time domain coding is not required, improving the coding efficiency. That the adaptive codebook contribution contributes to the output signal means that a high-quality output signal cannot be obtained at the decoding end only according to the coded frequency domain signal.

260: Multiplex the coded frequency domain signal and the coded second time domain signal into the bit stream.

It should be noted that, besides including the difference signal f_diff, the frequency domain signal on which the frequency domain coding needs to be performed may further include another signal, such as a flag (flag) indicating whether the adaptive codebook contribution contributes to the output signal. Similarly, besides including the adaptive codebook contribution exc_pit, the second time domain signal on which the time domain coding needs to be performed may further include other information required for decoding.

In the foregoing time-frequency joint coding that is described with reference to FIG. 2, bit allocation for a frequency domain signal is adjusted according to a highest frequency of the frequency domain signal to which bits are allocated, which is combined with time domain coding, so that a better coding effect is achieved.

Figure 3:
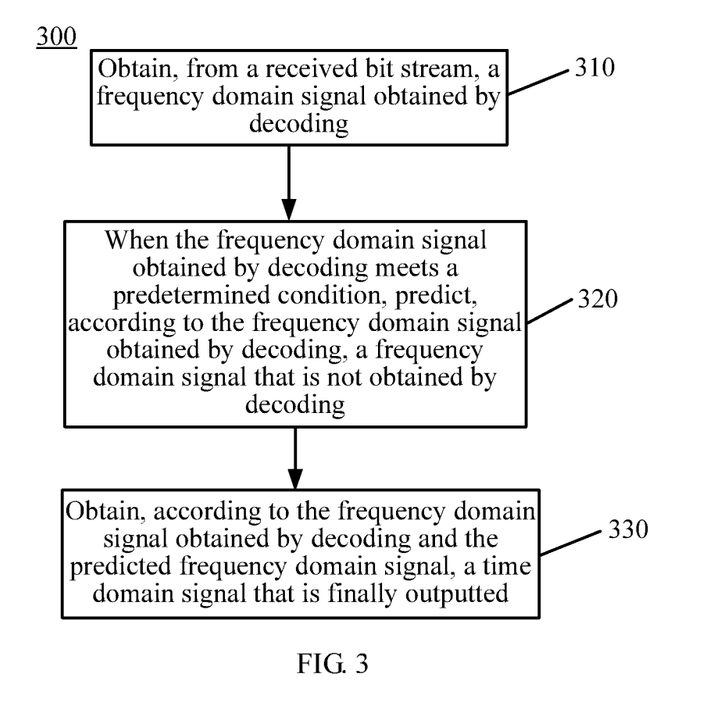
FIG. 3 shows a signal decoding method according to an embodiment of the present invention.

FIG. 3 shows a signal decoding method 300 according to an embodiment of the present invention. The method 300 includes:

310: Obtain, from a received bit stream, a frequency domain signal obtained by decoding. When only frequency domain coding is used, by using a frequency domain decoding method corresponding to a frequency domain coding method, the frequency domain signal obtained by decoding is obtained from the received bit stream. In the case of time-frequency joint coding, the frequency domain signal obtained by decoding is obtained from the received bit stream by performing the following operations: performing frequency domain decoding on frequency domain information in the bit stream to obtain a first frequency domain signal; determining, according to the first frequency domain signal, whether a time domain coding signal that contributes to an output signal exists in the bit stream; when it is determined that a time domain coding signal that contributes to the output signal exists in the bit stream, performing time domain decoding and frequency domain transformation on the time domain coding signal to obtain a second frequency domain signal, and synthesizing the first frequency domain signal and the second frequency domain signal to obtain the frequency domain signal obtained by decoding. This is further described below in detail with reference to FIG. 4.

320: When the frequency domain signal obtained by decoding meets a predetermined condition, predict, according to the frequency domain signal obtained by decoding, a frequency domain signal that is not obtained by decoding. As an example, that the frequency domain signal obtained by decoding meets a predetermined condition includes at least one of the following: a highest frequency of the frequency domain signal obtained by decoding is greater than a predetermined value, and the frequency domain signal obtained by decoding includes a time domain coding signal on which the frequency domain transformation is performed and that contributes to an output signal. It should be noted that, in practice, a determining condition that the frequency domain signal obtained by decoding includes a time domain coding signal on which the frequency domain transformation is performed and that contributes to an output signal may be applied first, and then a determining condition that a highest frequency of the frequency domain signal obtained by decoding is greater than a predetermined value is applied; or an inverse sequence is used, or only one of the two may be used.

As described above with reference to 130 in FIG. 1, the predetermined value is determined according to the number tot_bit of predetermined bits used for the frequency domain coding and a resolution of the frequency domain signal. According to a requirement of practice, the predetermined value may be set to a frequency value that is a certain frequency less than a value of the highest frequency of the frequency domain signal. When the frequency domain signal is divided into sub-bands, the predetermined value may be an index number of a sub-band, and the highest frequency of the frequency domain signal to which bits are allocated is also represented by using an index number of a sub-band in which the highest frequency domain is located. A value of the predetermined value at a decoding end may be the same as or may be different from a value of the predetermined value at a coding end.

In the case of the time-frequency joint coding, the frequency domain signal obtained by decoding, which is obtained by decoding the bit stream in 310, possibly includes the time domain coding signal on which the frequency domain transformation is performed and that contributes to the output signal, and the time domain coding signal on which the frequency domain transformation is performed and that contributes to the output signal, for example, is a signal that is obtained by performing the time domain decoding and the frequency domain transformation on time domain coding information included in the bit stream, such as an adaptive codebook contribution. According to different types of coded signals and when a time domain analysis method used during the coding is not an LPC analysis, the time domain coding signal on which the frequency domain transformation is performed and that contributes to the output signal may also be another signal except the adaptive codebook contribution.

When the frequency domain signal obtained by decoding includes the adaptive codebook contribution, it may be learned, according to a flag (flag) indicating whether the foregoing adaptive codebook contribution contributes to the output signal, whether the frequency domain signal obtained by decoding includes the time domain coding signal on which the frequency domain transformation is performed and that contributes to the output signal. The frequency domain signal obtained by decoding includes the time domain coding signal on which the frequency domain transformation is performed and that contributes to the output signal, which indicates that a high-quality output is difficult to be obtained by only relying on the frequency domain decoding, and according to a feature of a speech/audio signal, in this case, simply setting the frequency domain signal that is not obtained by decoding to noise deteriorates the quality of the output signal, so that the frequency domain signal that is not obtained by decoding needs to be predicted.

As an example of predicting, according to the frequency domain signal obtained by decoding, the frequency domain signal that is not obtained by decoding, a frequency domain signal of a frequency band may be selected from the highest frequency of the frequency domain signal obtained by decoding to a low frequency, and the frequency domain signal that is not obtained by decoding may be predicted according to the selected frequency domain signal. For example, for a signal whose frame length is 20 ms and sampling rate is 12.8 kHz, there are 256 frequency domain coefficients, and a bandwidth is 6.4 kHz; when a code rate is 7.6 kbps, one sub-band for every 16 coefficients, there are 16 sub-bands in total, and the predetermined value is set to 10 (4 kHz); and when a highest frequency band of the frequency domain signal obtained by decoding is greater than 10, a frequency domain coefficient that is not obtained by decoding in a range of 4 to 6.4 kHz is obtained through prediction by using a frequency domain coefficient that is obtained by decoding in a range of 1.6 to 4 kHz. As an example of implementation of the prediction, the frequency domain signal that is not obtained by decoding may be predicted by performing normalization processing, envelope processing, and the like on the selected frequency domain signal. The implementation of the normalization processing and the envelope processing is a means that is known to a person skilled in the art, and is not described in detail herein. In addition, according to a type of the output signal, a person skilled in the art may predict, by selecting another manner, the frequency domain signal that is not obtained by decoding, for example, may also predict, according to a frequency domain signal in a fixed frequency band in the frequency domain signal obtained by decoding, the frequency domain signal that is not obtained by decoding.

It should be noted that, after the frequency domain signal that is not obtained by decoding is obtained according to the frequency domain signal obtained by decoding, a predicted frequency domain coefficient that is not obtained by decoding can be corrected by using an ISF parameter or an LSF parameter from the coding end, to prevent the predicted frequency domain signal from including a frequency channel number with excessive energy. For example, a resonant peak location is estimated by using the LSF parameter or the ISF parameter; and at each estimated resonant peak location, a frequency domain coefficient with a greater amplitude is scaled. As an example, when an amplitude of a predicted frequency domain coefficient near the resonant peak location is greater than a threshold (the threshold may be set according to a characteristic of a time domain analysis at the coding end), the amplitude of the predicted frequency domain coefficient near the resonant peak location is decreased.

In addition, when the frequency domain signal does not meet the predetermined condition, the frequency domain signal that is not obtained by decoding is predicted by using noise.

330: Obtain, according to the frequency domain signal obtained by decoding and the predicted frequency domain signal, a time domain signal that is finally outputted. The frequency domain signal obtained by decoding is obtained by decoding and the frequency domain signal that is not obtained by decoding is predicted, so as to obtain frequency domain signals in an entire frequency band, an output signal in a time domain is obtained by performing processing such as frequency domain inverse transformation, for example, inverse fast Fourier transform (IFFT, Inverse Fast Fourier Transform). As an example, in the case of the time-frequency joint coding, an LPC coefficient is obtained by performing transformation on the ISF parameter or the LSF parameter, time domain synthesis is performed, by using the LPC coefficient, on a signal obtained after the frequency domain inverse transformation, to obtain a time domain signal that is finally outputted. In practice, an engineering technical person in the art knows a solution about how to obtain the output signal in the time domain according to the frequency domain signal, which is not be described in detail herein.

In the foregoing signal decoding method according to this embodiment of the present invention, which is described with reference to FIG. 3, a frequency domain signal that is not obtained by decoding is set under the guidance of a frequency domain signal obtained by decoding, so as to achieve a better effect of an output signal.

Figure 4:
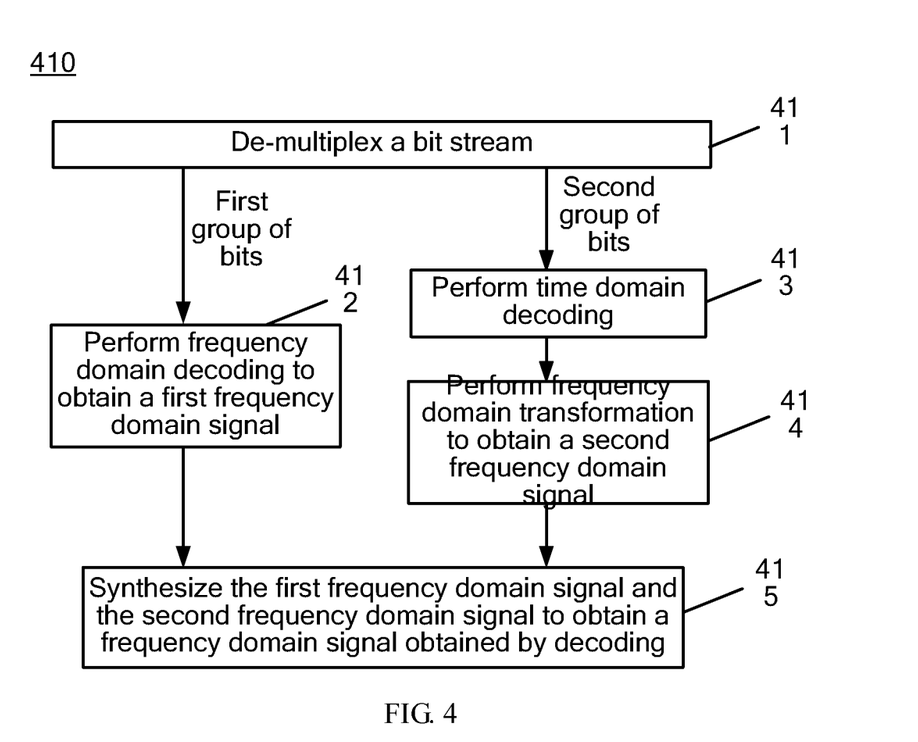
FIG. 4 shows a method for obtaining, from a received bit stream, a frequency domain signal obtained by decoding in a time-frequency joint decoding method.

To better disclose this embodiment of the present invention to a person skilled in the art, the following describes, with reference to FIG. 4, an application of the decoding method according to this embodiment of the present invention in a time-frequency joint decoding solution. In the time-frequency joint decoding solution, except the step of obtaining, from a received bit stream, a frequency domain signal obtained by decoding (310), subsequent operations are the same as those in 320 and 330 described with reference to FIG. 3. Therefore, the following only describes how to obtain, in a time-frequency joint decoding method, the frequency domain signal obtained by decoding.

FIG. 4 shows a method 410 for obtaining, from a received bit stream, a frequency domain signal obtained by decoding in a time-frequency joint decoding method. The method 410 includes:

411: De-multiplex a bit stream into a first group of bits and a second group of bits. During decoding at a receive end, when the bit stream is received, the bit stream is de-multiplexed into the first group of bits and the second group of bits by using a de-multiplexing technology corresponding to a multiplexing technology in 260 in FIG. 2. The first group of bits includes frequency domain information on which the following frequency domain decoding needs to be performed, and the second group of bits includes a time domain coding signal on which the following time domain decoding needs to be performed and that contributes to an output signal.

For time domain joint decoding of an audio signal, the first group of bits, for example, includes a difference signal f_diff, a flag (flag) indicating whether an adaptive codebook contribution contributes to an output signal, and the like. The second group of bits, for example, includes the adaptive codebook contribution when the adaptive codebook contribution contributes to the output signal. It should be noted that, when encoding the first group of bits and the second group of bits and signal, another signal may further be encoded correspondingly.

412: Perform the frequency domain decoding on the first group of bits to obtain a first frequency domain signal, and determine, according to the first frequency domain signal, whether a time domain coding signal that contributes to the output signal exists in the bit stream. The first group of bits is decoded by using a decoding method corresponding to a frequency domain coding method at a coding end, to obtain the first frequency domain signal. The first frequency domain signal, for example, includes a decoded difference signal f_diff, and the flag (flag) indicating whether the adaptive codebook contribution contributes to the output signal.

413: Perform the time domain decoding on the second group of bits. The second group of bits is decoded by using a decoding method corresponding to a time domain coding method at the coding end, to obtain a decoded time domain signal. Specifically, when it is determined that a time domain coding signal that contributes to the output signal exists in the bit stream, the time domain decoding is performed on the time domain coding signal in the second group of bits.

414: Perform frequency domain transformation on the adaptive codebook contribution in the decoded time domain signal, to obtain a second frequency domain signal.

415: Synthesize the first frequency domain signal and the second frequency domain signal to obtain the frequency domain signal obtained by decoding. As an example, when the adaptive codebook contribution contributes to the output signal, the frequency domain signal is obtained through synthesis by adding the difference signal f_diff in the first frequency domain signal and the adaptive codebook contribution in the second frequency domain signal. When the adaptive codebook contribution does not contribute to the output signal, the difference signal f_diff in the first frequency domain signal is directly used as the frequency domain signal.

After the frequency domain signal obtained by decoding is obtained, a time domain signal that is finally outputted is obtained by using steps that are the same as 320 and 330 in FIG. 3.

Associated with the foregoing method embodiments, the present invention further provides a coding device and a decoding device, where the coding device or the decoding device may be located in a terminal device, a network device, or a test device. The coding device or the decoding device may be implemented by a hardware circuit, or be implemented by software in cooperation with hardware.

Figure 5:
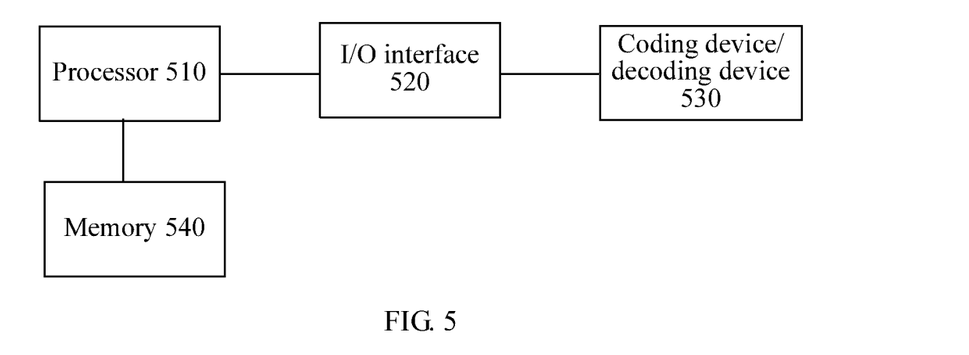
FIG. 5 shows exemplary implementation of a coding device and/or a decoding device according to the present invention.

FIG. 5 shows exemplary implementation of a coding device and/or a decoding device according to the present invention. As shown in FIG. 5, a processor 510 invokes a coding device or decoding device 530 by using an input/output interface 520, and implements coding or decoding processing of an audio signal with assistance of a memory 540. The coding device or decoding device 530 may perform various methods and procedures in the foregoing method embodiments.

Figure 6:
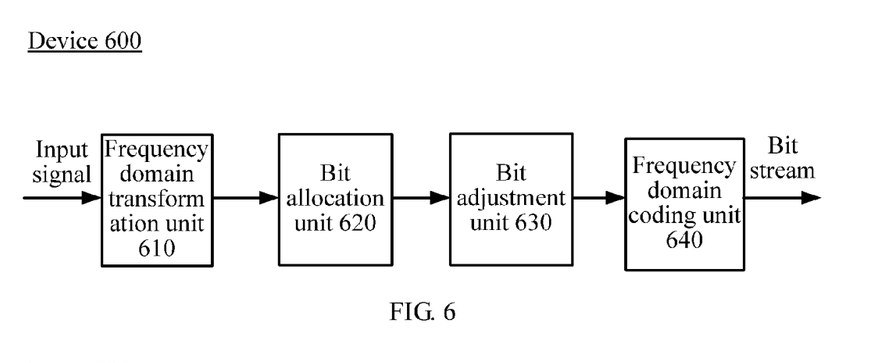
FIG. 6 shows a coding signal coding device according to an embodiment of the present invention.

FIG. 6 shows a coding device 600 for signal coding according to an embodiment of the present invention. The coding device 600 includes: a frequency domain transformation unit 610, which obtains a frequency domain signal according to an input signal; a bit allocation unit 620, which allocates predetermined bits to the frequency domain signal according to a predetermined allocation rule; a bit adjustment unit 630, which adjusts the bit allocation for the frequency domain signal when a highest frequency of the frequency domain signal to which bits are allocated is greater than or equal to a predetermined value; and a frequency domain coding unit 640, which codes the frequency domain signal according to the bit allocation that has been adjusted.

The frequency domain transformation unit 610 may obtain the frequency domain signal according to the input signal. The input signal may be a signal of various types, such as an image signal, a data signal, an audio signal, a video signal, or a text signal. Frequency domain transformation may be performed on the input signal by using an algorithm such as an FFT or a DCT, to obtain the frequency domain signal. The type of the input signal and the frequency domain transformation algorithm do not constitute a limitation to the present invention.

The bit allocation unit 620 may allocate predetermined bits tot_bit to the frequency domain signal according to a predetermined allocation rule. The tot_bit is the number of bits that need to be used for performing coding on the frequency domain signal. The predetermined allocation rule, for example, may be that: more bits in the predetermined bits are allocated to a low frequency band signal in the frequency domain signal, and rest bits in the predetermined bits are allocated to a frequency band with greater energy except the low frequency band signal. For allocation of a frequency domain signal in a low frequency band, the more bits may be uniformly allocated to the low frequency band signal for all low frequency bands or the more bits may be allocated to the low frequency band signal according to energy distribution of the low frequency band signal. A reason for allocating the more bits to the low frequency band signal is that, in a frequency domain, an audio signal such as a speech is mainly concentrated in a low frequency range, and allocating the more bits to the audio signal can improve the efficiency of frequency domain coding.

As an example, in an exemplary case in which the frequency domain coding is performed on the audio signal, as described above with reference to 120 in FIG. 1, a frequency domain signal in a frequency range of 0 to 4 kHz is divided into 10 sub-bands, where there are 5 sub-bands in a frequency range of 0 to 2 kHz, and there are 5 sub-bands in a frequency range of 2 to 4 kHz. Then, bit allocation is performed for each sub-band. The more bits whose quantity is 1F_bit are allocated to a low frequency domain signal in the frequency range of 0 to 2 kHz. Rest bits rest_bit (subtracting 1F_bit from the tot_bit) are allocated to the sub-bands in the frequency range of 2 to 4 kHz according to an envelope of each sub-band in the frequency range of 2 to 4 kHz. Specifically, the number of sub-bands to which bits are allocated and a sub-band last_bin of a highest frequency band to which bits are allocated are determined according to the rest_bits and an envelope size of each sub-band, and at the same time, a remainder that cannot be exactly divided by 5 is evenly allocated to each sub-band in the range of 0 to 2 kHz.

The bit adjustment unit 630 may adjust the bit allocation for the frequency domain signal when the highest frequency of the frequency domain signal to which bits are allocated is greater than or equal to the predetermined value B. The predetermined value B is determined according to the bit number tot_bit of the predetermined bits and a resolution (for example, 4 kHz) of the frequency domain signal. The predetermined value is a preset upper-limit frequency value. In specific practice, the predetermined value B may be set to a frequency value that is a certain frequency less than a value (for example, 4 kHz) of the highest frequency of the frequency domain signal, for example, set to 2.9 kHz, 3.2 kHz, 3.5 kHz, or the like. As described above, when the frequency domain signal is divided into the sub-bands for coding, the predetermined value B may be an index number (for example, 7 or 8) of 10 sub-bands in a frequency range of 0 to 4 kHz, and at this time, the highest frequency of the frequency domain signal to which bits are allocated may also be represented by using an index number index of a sub-band in which the highest frequency is located.

If the highest frequency (for example, index=7) of the frequency domain signal to which bits are allocated is less than the predetermined value (for example, B=8), the allocation of the predetermined bits that is performed according to the predetermined allocation rule in the bit allocation unit 620 is maintained.

When the highest frequency is greater than or equal to the predetermined value, the bit adjustment unit 630 may adjust the bit allocation for the frequency domain signal that is performed, according to the predetermined allocation rule, by the bit allocation unit 620. According to the type of the input signal, a frequency domain characteristic of the frequency domain signal, or the like, a part that contributes less to an output at a decoding end in the frequency domain signal may be reduced, and bits allocated to the highest frequency to which bits are allocated and its nearby frequency domain signal may accordingly be increased. As an example, the bit adjustment unit 630 may reduce the number of bits allocated to a frequency band to which more bits are allocated in the frequency domain signal, and increase the number of bits allocated to the highest frequency to which bits are allocated and its nearby frequency domain signal. For an audio signal, the frequency band to which more bits are allocated is a low frequency band of 0 to 2 kHz.

For implementation of adjusting the bit allocation for the frequency domain signal, reference may be made to the adjustment examples 1 to 3 that are described above, which are not be described in detail herein again.

The frequency domain coding unit 640 codes the frequency domain signal according to the bit allocation that has been adjusted. A method for coding the frequency domain signal, for example, may be transformation coding, sub-band coding, or the like. In addition, when the highest frequency is less than the predetermined value, the bit adjustment unit 630 does not adjust the bit allocation for the frequency domain signal. In this case, the bit allocation for the frequency domain signal is bit allocation that is performed according to a predetermined bit allocation rule, and the frequency domain coding unit 640 codes the frequency domain signal according to the bit allocation that is performed according to the predetermined bit allocation rule.

In the foregoing device 600 for signal coding, bit allocation for a frequency domain signal is adjusted according to a highest frequency of the frequency domain signal to which bits are allocated, so that a better coding effect is achieved.

The coding device 600 may be properly applied to various coding technologies, and the following uses an application of the device in time-frequency joint coding as an example for exemplary description.

Figure 7:
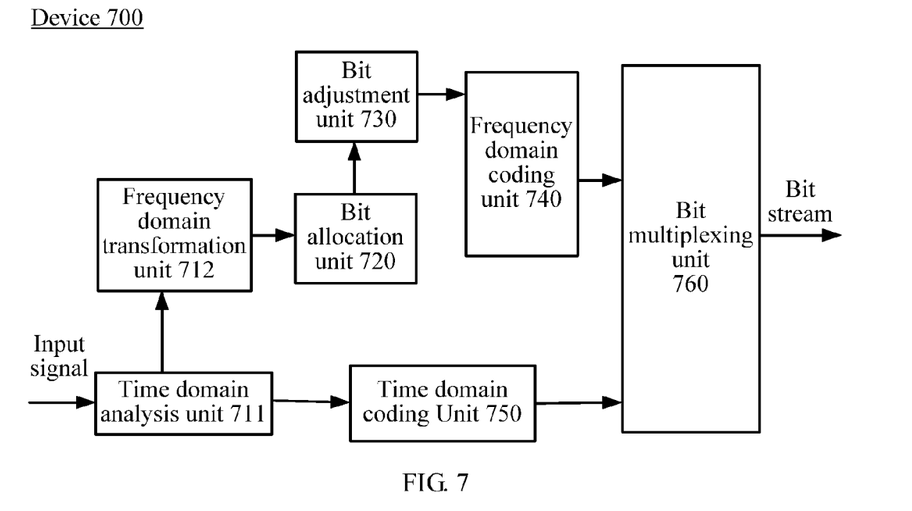
FIG. 7 shows a time-frequency joint coding device using a coding device in an embodiment of the present invention.

FIG. 7 shows a time-frequency joint coding device 700 using a coding device in an embodiment of the present invention.

The time-frequency joint coding device 700 includes: a time domain analysis unit 711, which obtains a first time domain signal and a second time domain signal by performing a time domain analysis on an input signal; a frequency domain transformation unit 712, which obtains a frequency domain signal by performing frequency domain transformation and processing on the first time domain signal; a bit allocation unit 720, which allocates predetermined bits to the frequency domain signal according to a predetermined allocation rule; a bit adjustment unit 730, which adjusts the bit allocation for the frequency domain signal when a highest frequency of the frequency domain signal to which bits are allocated is greater than or equal to a predetermined value; a frequency domain coding unit 740, which codes the frequency domain signal according to the bit allocation that has been adjusted; a time domain coding unit 750, which codes the second time domain signal; and a bit multiplexing unit 760, which multiplexes a coded frequency domain signal and a coded second time domain signal into a bit stream.

The bit allocation unit 720, the bit adjustment unit 730, and the frequency domain coding unit 740 in FIG. 7 are respectively the same as the bit allocation unit 620, the bit adjustment unit 630, and the frequency domain coding unit 640 in FIG. 6. Differences between FIG. 7 and FIG. 6 lie in that, the time domain coding unit 750 and the bit multiplexing unit 760 are added, and the frequency domain transformation unit 610 in FIG. 6 is replaced by the time domain analysis unit 711 and the frequency domain transformation unit 712. The following describes the differences between FIG. 7 and FIG. 6, and does not describe the content in common again.

The time domain analysis unit 711 obtains the first time domain signal and the second time domain signal by performing the time domain analysis on the input signal. For example, an LPC analysis and processing are performed on the input signal to obtain an ISF parameter (or an LSF parameter), a residual signal res, and an adaptive codebook contribution exc_pit. The residual signal res and the adaptive codebook contribution exc_pit are used as the first time domain signal, and the adaptive codebook contribution exc_pit is used as the second time domain signal.

The frequency domain transformation unit 712 may obtain the frequency domain signal by performing the frequency domain transformation and processing on the first time domain signal. As an example, the frequency domain transformation is performed separately on the residual signal res and the adaptive codebook contribution exc_pit in the first time domain signal, and then it is determined, according to relevance between a residual signal f_res of a frequency domain and an adaptive codebook contribution f_exc_pit of the frequency domain, whether the adaptive codebook contribution contributes to an output signal. If the adaptive codebook contribution contributes to the output signal, the adaptive codebook contribution f_exc_pit of the frequency domain is subtracted from the residual signal f_res of the frequency domain, to obtain a difference signal f_diff of the frequency domain, and the difference signal f_diff is included in the frequency domain signal. If the adaptive codebook contribution does not contribute to the output signal, the residual signal f_res of the frequency domain is directly used as the difference signal f_diff and is transmitted as the frequency domain signal. Besides including the difference signal f_diff, the frequency domain signal may further include another signal, for example, a flag (flag) indicating whether the adaptive codebook contribution contributes to the output signal.

After the frequency domain signal is obtained, the frequency domain signal is coded by using the bit allocation unit 720, the bit adjustment unit 730, and the frequency domain coding unit 740 in FIG. 7, to obtain a coded frequency domain signal.

The time domain coding unit 750 may code the second time domain signal. The time domain signal may be coded by using a time domain coding method such as prediction coding or pulse code modulation. When the adaptive codebook contribution contributes to the output signal, the adaptive codebook contribution needs to be obtained at a decoding end, and therefore, the adaptive codebook contribution exc_pit in the second time domain signal is coded, so that it is transmitted to a receive end. However, if the adaptive codebook contribution does not contribute to the output signal, the adaptive codebook contribution does not need to be coded and transmitted, improving the coding efficiency. The bit multiplexing unit 760 may multiplex the coded frequency domain signal and the coded second time domain signal into the bit stream.

In the foregoing time-frequency joint coding device that is described with reference to FIG. 7, bit allocation for a frequency domain signal is adjusted according to a highest frequency of the frequency domain signal to which bits are allocated, which is combined with time domain coding, so that a better coding effect is achieved.

Figure 8:
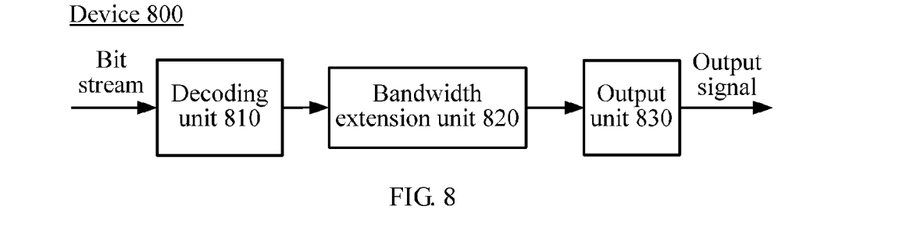
FIG. 8 shows a signal decoding device according to an embodiment of the present invention.

FIG. 8 shows a decoding device 800 for signal decoding according to an embodiment of the present invention. The decoding device 800 includes: a decoding unit 810, which obtains, from a received bit stream, a frequency domain signal obtained by decoding; a bandwidth extension unit 820, configured to predict a frequency domain signal that is not obtained by decoding, and when the frequency domain signal obtained by decoding meets a predetermined condition, predict, according to the frequency domain signal obtained by decoding, the frequency domain signal that is not obtained by decoding; and an output unit 830, which obtains, according to the frequency domain signal obtained by decoding and the predicted frequency domain signal, a time domain signal that is finally outputted.

The decoding unit 810 may obtain, from the received bit stream, the frequency domain signal obtained by decoding. When only frequency domain coding is used, by using a frequency domain decoding method corresponding to a frequency domain coding method, the frequency domain signal obtained by decoding is obtained from the received bit stream. In the case of time-frequency joint coding, the decoding unit 810 may obtain, from the received bit stream by performing the following operations, the frequency domain signal obtained by decoding: performing frequency domain decoding on frequency domain information in the bit stream to obtain a first frequency domain signal; determining, according to the first frequency domain signal, whether a time domain coding signal that contributes to an output signal exists in the bit stream; when it is determined that a time domain coding signal that contributes to the output signal exists in the bit stream, performing time domain decoding and frequency domain transformation on the time domain coding signal to obtain a second frequency domain signal, and synthesizing the first frequency domain signal and the second frequency domain signal to obtain the frequency domain signal obtained by decoding. This is described below in detail with reference to FIG. 9.

The bandwidth extension unit 820 may be configured to predict the frequency domain signal that is not obtained by decoding. When the frequency domain signal obtained by decoding meets the predetermined condition, the bandwidth extension unit 820 may predict, according to the frequency domain signal obtained by decoding, the frequency domain signal that is not obtained by decoding. As an example, that the frequency domain signal obtained by decoding meets a predetermined condition includes at least one of the following: a highest frequency of the frequency domain signal obtained by decoding is greater than a predetermined value, and the frequency domain signal obtained by decoding includes a time domain coding signal on which the frequency domain transformation is performed and that contributes to the output signal. In practice, selection may be performed according to a need.

As described above, the predetermined value may be determined according to the number tot_bit of predetermined bits used for the frequency domain coding and a resolution of the frequency domain signal. According to a need of practice, the predetermined value may be set to a frequency value that is a certain frequency less than a value of the highest frequency of the frequency domain signal. When the frequency domain signal is divided into sub-bands, the predetermined value may be an index number of a sub-band, and the highest frequency of the frequency domain signal to which bits are allocated is also represented by using an index number of a sub-band in which the highest frequency domain is located.

When a time-frequency joint decoding technology is used, the frequency domain signal obtained by decoding, which is obtained by the decoding unit 810 by decoding the bit stream, possibly includes a signal that is obtained by performing the time domain decoding and the frequency domain transformation on time domain information included in the bit stream, for example, an adaptive codebook contribution. It may be learned, according to a flag (flag) indicating whether the foregoing adaptive codebook contribution contributes to the output signal, whether the frequency domain signal includes the time domain coding signal on which the frequency domain transformation is performed and that contributes to the output signal. According to different types of coded signals and when a time domain analysis method used during the coding is not an LPC analysis, the time domain coding signal on which the frequency domain transformation is performed and that contributes to the output signal may also be another signal.

The frequency domain signal obtained by decoding includes the signal that is obtained by performing the time domain decoding and the frequency domain transformation on the time domain information included in the bit stream, which indicates that the frequency domain signal that is not obtained by decoding includes information that is useful to an output, so that the frequency domain signal that is not obtained by decoding needs to be predicted, and simply setting the frequency domain signal that is not obtained by decoding to noise deteriorates the quality of an output signal.

In addition, when the frequency domain signal obtained by decoding does not meet the predetermined condition, the bandwidth extension unit 820 may set the frequency domain signal that is not obtained by decoding to the noise.

As an example of predicting, according to the frequency domain signal obtained by decoding, the frequency domain signal that is not obtained by decoding, the bandwidth extension unit 820 may select a frequency domain signal of a frequency band from the highest frequency of the frequency domain signal obtained by decoding to a low frequency, and process the selected frequency domain signal as described above, so as to predict, according to the selected frequency domain signal, the frequency domain signal that is not obtained by decoding. In addition, the frequency domain signal that is not obtained by decoding may also be predicted by using another manner, for example, the frequency domain signal that is not obtained by decoding may also be predicted according to a frequency domain signal in a fixed frequency band in the frequency domain signal obtained by decoding.

The output unit 830 may obtain, according to the frequency domain signal obtained by decoding and the predicted frequency domain signal, the time domain signal that is finally outputted. After the frequency domain signal that is not obtained by decoding is predicted, frequency domain signals in an entire frequency band are obtained, and frequency domain inverse transformation is performed on frequency domain signals in an entire bandwidth by using inverse transformation of the frequency domain transformation used during the coding, so that an output signal in a time domain is obtained. As described above, the output unit may perform a time domain synthesis, by using an LPC coefficient that is obtained according to an ISF parameter (or an LSF parameter), on a signal after the frequency domain inverse transformation, to obtain the time domain signal that is finally outputted for outputting.

For more detailed operations of the units in the decoding device 800, reference may be made to the foregoing steps that are described with reference to FIG. 3.

In the foregoing the decoding device 800 for signal decoding according to this embodiment of the present invention, which is described with reference to FIG. 8, a frequency domain signal that is not obtained by decoding is set under the guidance of a frequency domain signal obtained by decoding, so as to make an output signal achieves a better effect.

To better disclose this embodiment of the present invention to a person skilled in the art, the following briefly describes an application of the decoding device according to this embodiment of the present invention in a time-frequency joint decoding solution. In the time-frequency joint decoding solution, except the operations of the decoding unit 810, operations of other composition units are the same as the operations of the bandwidth extension unit 820 and the output unit 830. Therefore, the following only describes specific implementation of the decoding unit 810 in a time-frequency joint decoding method.

Figure 9:
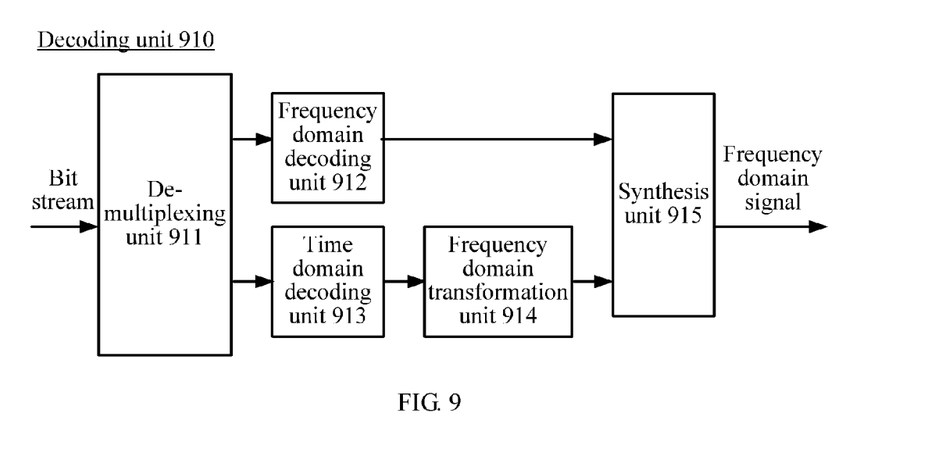
FIG. 9 shows a block diagram of a decoding unit in time-frequency joint decoding.

FIG. 9 shows a block diagram of a decoding unit 910 in time-frequency joint decoding. The decoding unit 910 includes: a de-multiplexing unit 911, which de-multiplexes a bit stream into a first group of bits and a second group of bits; a frequency domain decoding unit 912, which performs frequency domain decoding on the first group of bits to obtain a first frequency domain signal, and determines, according to the first frequency domain signal, whether a time domain coding signal that contributes to an output signal exists in the bit stream; a time domain decoding unit 913, which performs time domain decoding in the second group of bits if it is determined that a time domain coding signal that contributes to the output signal exists in the bit stream; a frequency domain transformation unit 914, which performs frequency domain transformation on a decoded time domain signal to obtain a second frequency domain signal; and a synthesis unit 915, which synthesizes the first frequency domain signal and the second frequency domain signal to obtain a frequency domain signal obtained by decoding.

For the purpose of convenient and brief description, for specific operations of the de-multiplexing unit 911, the frequency domain decoding unit 912, the time domain decoding unit 913, the frequency domain transformation unit 914, or the synthesis unit 915, refer to 411, 412, 413, 414, and 415 in FIG. 4, which are not be described in detail herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In the several embodiments provided in the present application, it should be understood that the disclosed device and method may be implemented in other manners. For example, the described device embodiment is merely exemplary. For example, the unit division is merely logical function division and may be other division in actual implementation. For example, multiple units or components may be combined or integrated into another system, or some features may be ignored or not performed.

The units described as separate parts may or may not be physically separate, may be located in one position, or may be distributed on multiple network units. A part or all of the units may be selected as required to achieve objectives of the solutions of the embodiments.

In addition, functional units in the embodiments of the present invention may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A signal coding method performed by a network device comprising a processor to code an input audio signal, wherein the method comprises:
   obtaining a frequency domain signal of a current frame of the input audio signal, wherein the frequency domain signal has multiple bands;
   allocating available bits for coding the frequency domain signal to the bands of the frequency domain signal, wherein each band either has bits or has no bit allocated thereto;
   adjusting numbers of bits allocated to respective bands of the frequency domain signal when a highest index of a band with bits allocated thereto is greater than a threshold; and
   coding the frequency domain signal by using the adjusted bits allocation.

2. The method according to claim 1, wherein the adjusting comprises: decreasing the number of bits allocated to a band with more bits allocated, and increasing the number of bits allocated to the band with the highest index and a band near the band with the highest index, wherein a total number of bits decreased in the adjusting step is equal to a total number of bits increased in the adjusting step.

3. The method according to claim 1, wherein the threshold is determined according to the number of the available bits and a resolution of the frequency domain signal.

4. The method according to claim 1, wherein the available bits are allocated as following: more bits in the available bits are allocated to a band of the current frame with low index, and rest bits are allocated to a band of the current frame with greater energy except the low frequency band signal.

5. The method according to claim 1, further comprising:
   maintaining the bits allocated to the bands when the highest index of the band is less than the threshold.

6. A signal coding device for coding an input audio signal, comprising:
   a processor; and
   a non-transitory computer readable storage medium storing computer executable instructions,
   the processor being configured to execute the computer executable instructions to:
   obtain a frequency domain signal of a current frame of the input audio signal, wherein the frequency domain signal has multiple bands;
   allocate available bits for coding the frequency domain signal to bands of the frequency domain signal, wherein each band either has bits or has no bit allocated thereto;
   adjust numbers of bits allocated to respective bands of the frequency domain signal when a highest index of a band with bits allocated thereto is greater than a threshold; and
   code the frequency domain signal by using the adjusted bits allocation.

7. The device according to claim 6, wherein the adjust comprises: decrease the number of bits allocated to a band with more bits allocated, and increase the number of bits allocated to the band with the highest index and a band near the band with the highest index, wherein the number of bits decreased is equal to the number of bits increased.

8. The device according to claim 6, wherein the threshold is determined according to the number of the available bits and a resolution of the frequency domain signal.

9. The device according to claim 6, wherein the available bits are allocated as following: more bits in the available bits are allocated to a band of the current frame with low index, and rest bits are allocated to a band of the current frame with greater energy except the low frequency band signal.

10. The device according to claim 6, further comprising:
    maintain the bits allocated to the bands when the highest index of the band is less than the threshold.

* * * * *